(12) United States Patent
Chandupatla et al.

(10) Patent No.: US 11,555,711 B2
(45) Date of Patent: Jan. 17, 2023

(54) SYSTEMS AND METHODS FOR AUGMENTED REALITY IN A VEHICLE

(71) Applicant: Harman Becker Automotive Systems GmbH, Karlsbad (DE)

(72) Inventors: Srinivas Chandupatla, Telangana (IN); Balasubramanian Achuthan, Chennai (IN); Yerram Nalinikanth, Bangalore (IN)

(73) Assignee: Harman Becker Automotive Systems GmbH, Karlsbad (DE)

( * ) Notice: Subject to any disclaimer, the term of this patent is extended or adjusted under 35 U.S.C. 154(b) by 188 days.

(21) Appl. No.: 16/911,177

(22) Filed: Jun. 24, 2020

(65) Prior Publication Data

US 2021/0318135 A1    Oct. 14, 2021

(30) Foreign Application Priority Data

Apr. 11, 2020 (IN) .............................. 202041015794

(51) Int. Cl.
*G01C 21/36* (2006.01)
*B60K 35/00* (2006.01)

(52) U.S. Cl.
CPC ............ *G01C 21/365* (2013.01); *B60K 35/00* (2013.01); *G01C 21/367* (2013.01); *G01C 21/3682* (2013.01); *G01C 21/3694* (2013.01); *B60K 2370/166* (2019.05); *B60K 2370/177* (2019.05); *B60K 2370/347* (2019.05); *B60K 2370/73* (2019.05); *B60K 2370/785* (2019.05)

(58) Field of Classification Search
CPC .............. G01C 21/3682; G01C 21/365; G01C 21/3694; G01C 21/367; G01C 21/3676; B60K 35/00; B60K 2370/73; B60K 2370/177; B60K 2370/347; B60K 2370/785; B60K 2370/166
See application file for complete search history.

(56) References Cited

U.S. PATENT DOCUMENTS

| | | | |
|---|---|---|---|
| 6,272,431 B1* | 8/2001 | Zamojdo | G01C 21/36 701/454 |
| 8,164,543 B2 | 4/2012 | Seder et al. | |
| 8,818,716 B1* | 8/2014 | El Dokor | G01C 21/3664 701/426 |
| 11,256,934 B2* | 2/2022 | Han | G06V 20/582 |

(Continued)

FOREIGN PATENT DOCUMENTS

| | | |
|---|---|---|
| DE | 102014219575 A1 | 7/2015 |
| WO | 2019228779 A1 | 12/2019 |

OTHER PUBLICATIONS

European Patent Office, Extended European Search Report Issued in Application No. 21161263.5, dated Aug. 23, 2021, Germany, 7 pages.

(Continued)

*Primary Examiner* — Christopher E Leiby
(74) *Attorney, Agent, or Firm* — McCoy Russell LLP

(57) ABSTRACT

Systems and methods are provided herein for presenting information in a vehicle. In one example, a method includes determining a route from a source location to a destination location, obtaining one or more features of the route, augmenting a map of the route with the one or more features to generate an augmented map, and displaying the augmented map on a windshield of the vehicle.

15 Claims, 11 Drawing Sheets

(56) References Cited

U.S. PATENT DOCUMENTS

| | | | |
|---|---|---|---|
| 2008/0051946 A1 | 2/2008 | Breed | |
| 2015/0094897 A1* | 4/2015 | Cuddihy | H04N 21/4122 701/23 |
| 2015/0134180 A1* | 5/2015 | An | G05D 1/0289 701/23 |
| 2015/0330802 A1* | 11/2015 | Ono | B60W 50/14 701/431 |
| 2016/0025497 A1 | 1/2016 | Baalu et al. | |
| 2016/0311323 A1* | 10/2016 | Lee | B60K 37/06 |
| 2017/0363436 A1 | 12/2017 | Eronen et al. | |
| 2018/0165838 A1* | 6/2018 | Ganesh | G08G 1/16 |
| 2018/0225963 A1* | 8/2018 | Kobayashi | G08G 1/0962 |
| 2020/0018976 A1* | 1/2020 | Van Wiemeersch | B60K 35/00 |
| 2020/0086888 A1* | 3/2020 | Engle | G05D 1/0214 |
| 2020/0180436 A1* | 6/2020 | Obiagwu | B60W 50/10 |
| 2020/0209847 A1* | 7/2020 | Park | G08G 1/166 |
| 2020/0307691 A1* | 10/2020 | Kalabic | B62D 15/0255 |
| 2020/0312146 A1* | 10/2020 | Tanaka | G01C 21/34 |
| 2021/0056934 A1* | 2/2021 | Horihata | G01C 21/34 |
| 2021/0142526 A1* | 5/2021 | Mantyjarvi | B60W 50/0097 |
| 2021/0241713 A1* | 8/2021 | Vaarlid | G09G 3/19 |
| 2021/0372810 A1* | 12/2021 | Hato | G06T 13/80 |
| 2021/0377623 A1* | 12/2021 | Larson | H04N 21/235 |
| 2022/0044018 A1* | 2/2022 | Bai | G06N 20/00 |

OTHER PUBLICATIONS

Azuma, R., "A Survey of Augmented Reality," Presence: Teleoperators and Virtual Environments, vol. 6, No. 4, Aug. 1997, 48 pages.

"In-car entertainment," Wikipedia website, Available Online at https://en.wikipedia.org/wiki/In-car_entertainment, Available as Early as Dec. 6, 2006, 3 pages.

Gabbard, J. et al., "Behind the Glass: Driver Challenges and Opportunities for AR Automotive Applications," Proceedings of the IEEE, vol. 102, No. 2, Jan. 20, 2014, 13 pages.

Lowy, J., "Technology crammed into cars worsens driver distraction," Denver Post Website, Available Online at https://www.denverpost.com/2017/10/05/cars-technology-driver-distraction/, Oct. 5, 2017, 5 pages.

Huang, S., "How the Autonomous Car Works: A Technology Overview," Medium Website, Available Online at https://medium.com/@thewordofsam/how-the-autonomous-car-works-a-technology-overview-5c1ac468606f, Apr. 25, 2018, 7 pages.

Purcher, J., "Apple Invents an Augmented Reality Windshield that will even Support FaceTime calls between Different Vehicles," PatentlyApple Website, Available Online at https://www.patentlyapple.com/patently-apple/2018/08/apple-invents-an-augmented-reality-windshieldthat-will-even-support-facetime-calls-between-different-vehicles.html, Aug. 4, 2018, 12 pages.

\* cited by examiner

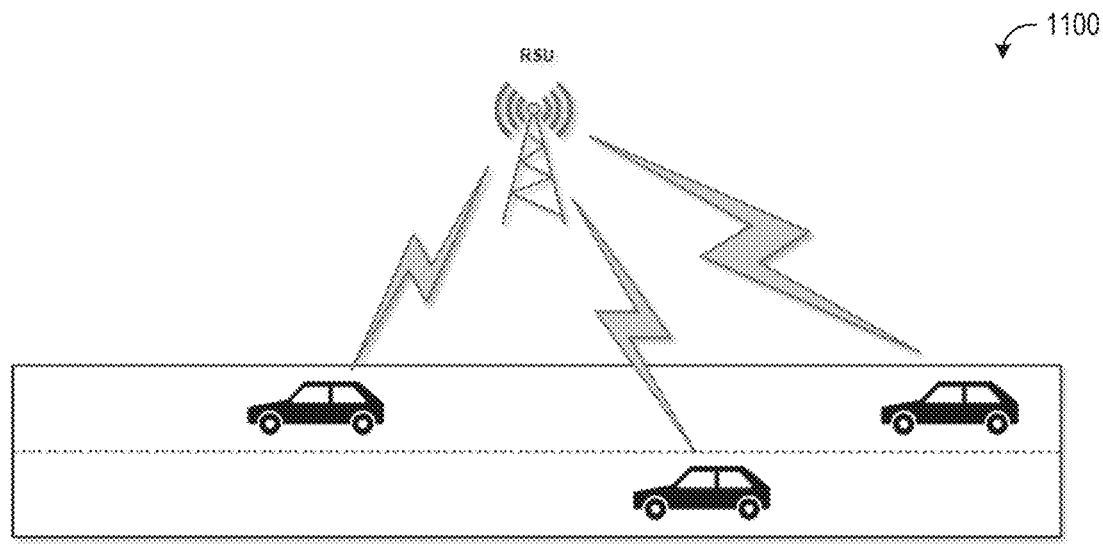
FIG. 11A
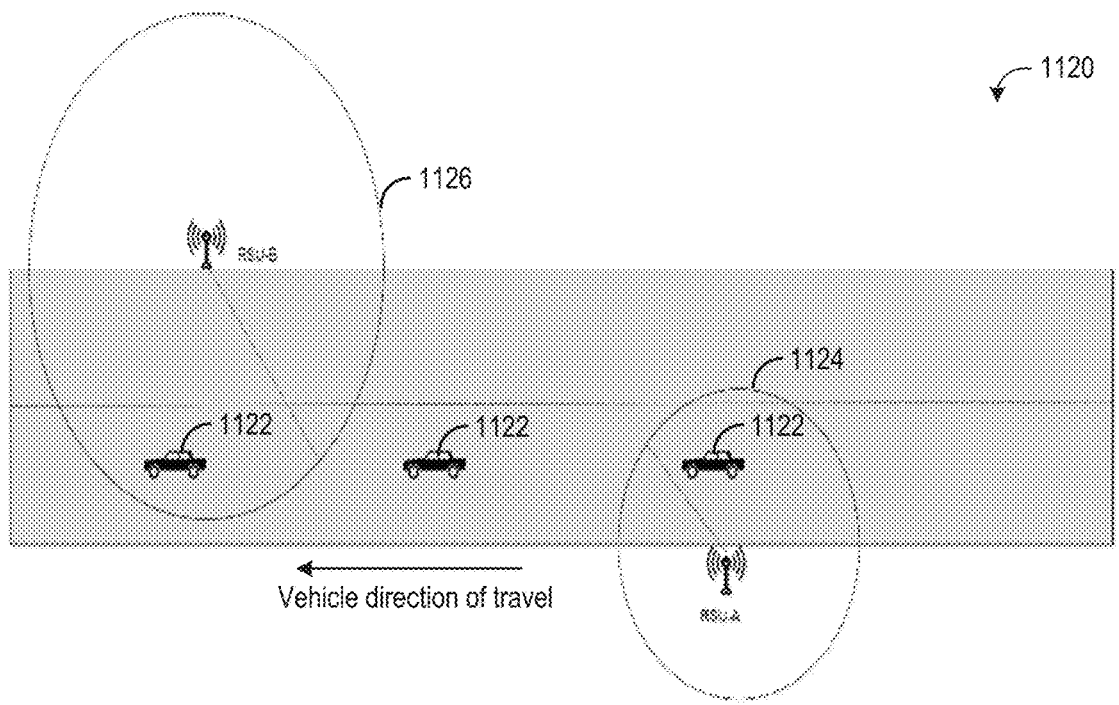
FIG. 11B
| Vehicle ID | Packet ID | Latitude | Longitude | 5G QoS Parameter 1 | 5G QoS Parameter 2 | 5G QoS Parameter 3 | ... |
FIG. 11AC

SYSTEMS AND METHODS FOR AUGMENTED REALITY IN A VEHICLE

CROSS REFERENCE TO RELATED APPLICATIONS

The present application claims priority to Indian Provisional Application No. 202041015794, entitled "SYSTEMS AND METHODS FOR AUGMENTED REALITY IN A VEHICLE", and filed on Apr. 11, 2020. The entire contents of the above-listed application are hereby incorporated by reference for all purposes.

BACKGROUND

The disclosure relates to an in-vehicle augmented reality projector, as well as related operations.

SUMMARY

Vehicles provide various information and services, such as streaming services, for in-vehicle infotainment systems. Information received from these services, as well as vehicle operating parameters, navigation information, etc., may be presented to vehicle occupants via one or more display screens. However, vehicle display screens may be small and positioned out of the line of sight of the vehicle driver.

In one embodiment, a method for presenting information in a vehicle includes determining a route from a source location to a destination location, obtaining one or more features of the route, augmenting a map of the route with the one or more features to generate an augmented map, and displaying the augmented map on a windshield of the vehicle.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 11A-11C schematically show a process for determining data coverage along a route in accordance with one or more embodiments of the present disclosure.

DETAILED DESCRIPTION

Figure 1:
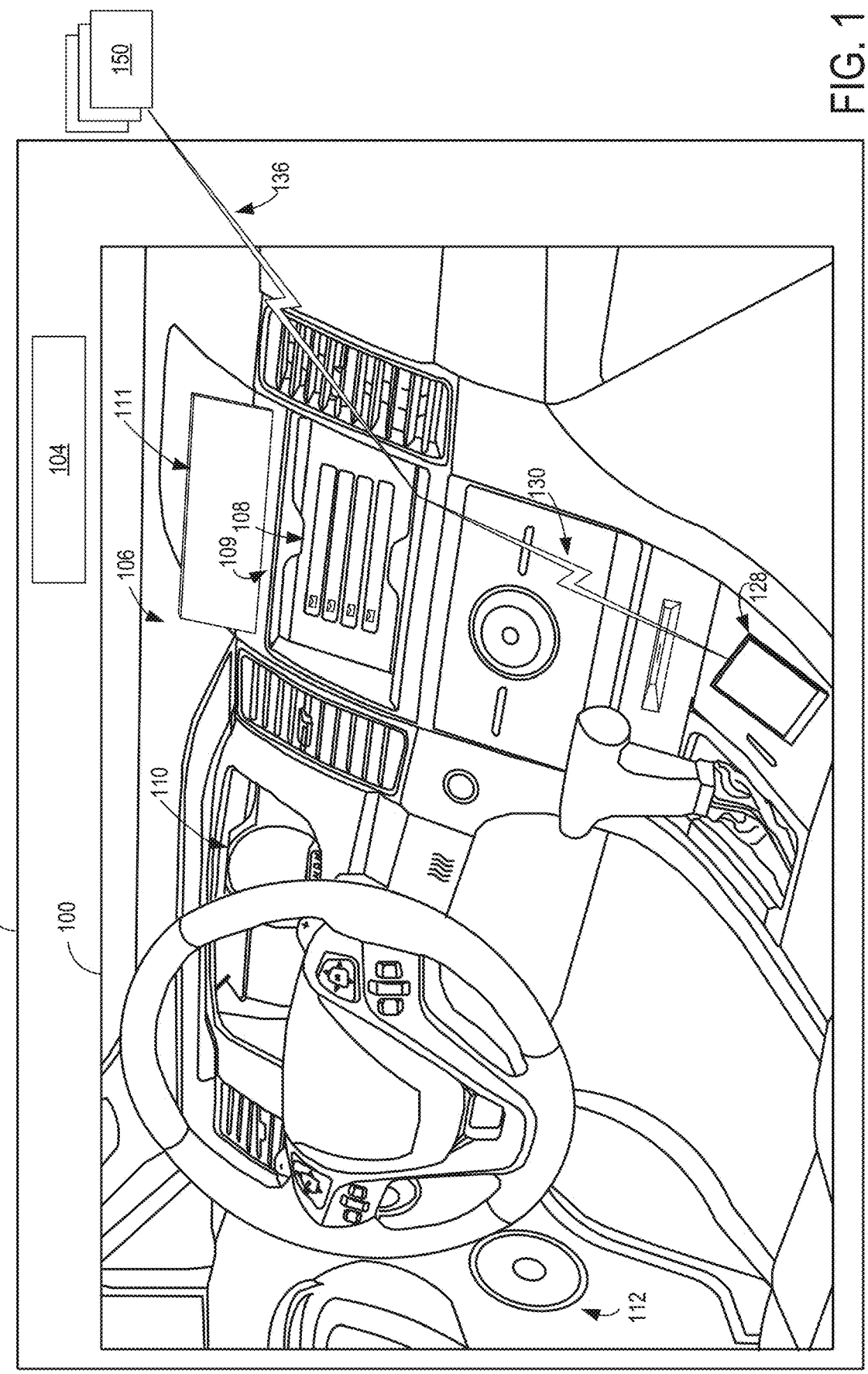
FIG. 1 shows an example partial view of a vehicle cabin in accordance with one or more embodiments of the present disclosure.

Turning now to FIG. 1, it shows an example partial view of one type of environment for an infotainment system that includes an image augmentation module configured to output augmentations to an augmented reality projector. The system includes an interior of a cabin 100 of a vehicle 102 in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a human driver (also referred to as the user) of vehicle 102. For example, instrument panel 106 may include a touch screen 108 of an in-vehicle computing system 109 (e.g., an infotainment system), an audio system control panel, and an instrument cluster 110. Touch screen 108 may receive user input to the in-vehicle computing system 109 for controlling audio output, visual display output, user preferences, control parameter selection, etc. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128. The audio system of the vehicle may include an amplifier (not shown) coupled to plurality of loudspeakers (not shown). In some embodiments, one or more hardware elements of in-vehicle computing system 109, such as touch screen 108, a display screen 111, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system 109 may be modular and may be installed in multiple locations of the vehicle.

The vehicle may include one or more sensors for monitoring the vehicle, the user, and/or the environment. For example, sensors may be positioned in a powertrain compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

The vehicle may include one or more cameras for monitoring the vehicle surroundings, traffic information, and/or the environment. For example, cameras may be positioned on the front, the sides, the rear, the top, and/or any other position on the vehicle. Image information captured by the one or more cameras may be displayed on the device displays described herein. For example, when the vehicle is in reverse, a video feed from one or more rear cameras may be displayed on a device display.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct, Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108. As described herein, the communication link may be limited in some locations, referred to as black spots.

In-vehicle computing system 109 may analyze the input received from external devices 150, mobile device 128, and/or other input sources and select settings for various in-vehicle systems (such as the audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
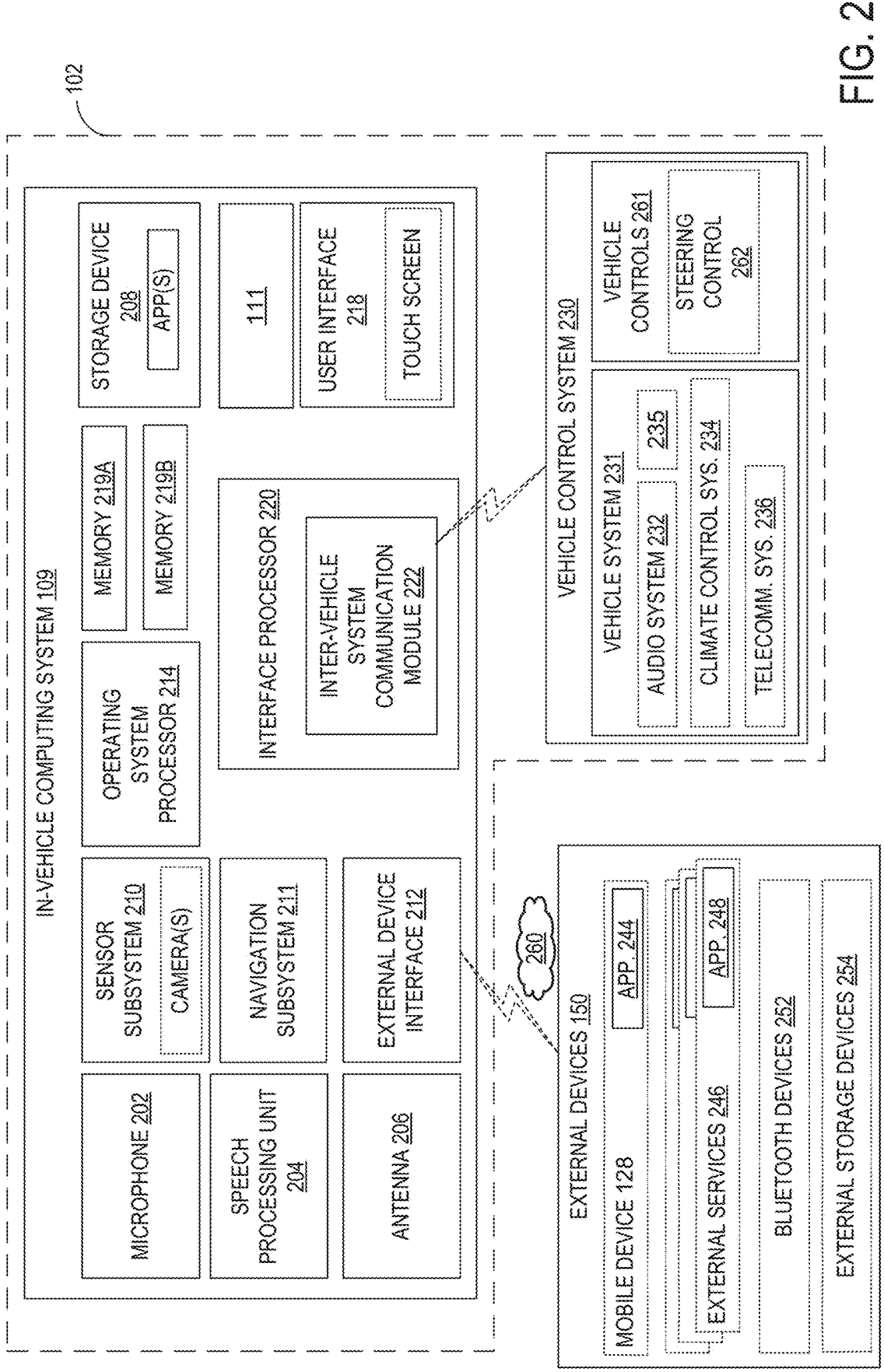
FIG. 2 shows an example in-vehicle computing system in accordance with one or more embodiments of the present disclosure.

FIG. 2 shows a block diagram of an in-vehicle computing system 109 configured and/or integrated inside vehicle 102. In-vehicle computing system 109 may perform one or more of the methods described herein in some embodiments. In some examples, the in-vehicle computing system 109 may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 102 in order to enhance an in-vehicle experience for a driver and/or a passenger.

In-vehicle computing system 109 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine CAN bus through which engine related information may be communicated, a climate control CAN bus through which climate control related information may be communicated, and a multimedia data network through which multimedia data is communicated between multimedia components in the vehicle). For example, the in-vehicle computing system 109 may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 109 to store data such as instructions executable by processors 214 and 220 in non-volatile form. The storage device 208 may store application data, including prerecorded sounds, to enable the in-vehicle computing system 109 to run an application for connecting to a cloud-based server and/or collecting information for transmission to the cloud-based server. The application may retrieve information gathered by vehicle systems/sensors, input devices (e.g., user interface 218), data stored in volatile 219A or non-volatile storage device (e.g., memory) 219B, devices in communication with the in-vehicle computing system (e.g., a mobile device connected via a Bluetooth link), etc. In-vehicle computing system 109 may further include a volatile memory 219A. Volatile memory 219A may be random access memory (RAM). Non-transitory storage devices, such as non-volatile storage device 208 and/or non-volatile memory 219B, may store instructions and/or code that, when executed by a processor (e.g., operating system processor 214 and/or interface processor 220), controls the in-vehicle computing system 109 to perform one or more of the actions described in the disclosure.

A microphone 202 may be included in the in-vehicle computing system 109 to receive voice commands from a user, to measure ambient noise in the vehicle, to determine whether audio from speakers of the vehicle is tuned in accordance with an acoustic environment of the vehicle, etc.

A speech processing unit 204 may process voice commands, such as the voice commands received from the microphone 202. In some embodiments, in-vehicle computing system 109 may also be able to receive voice commands and sample ambient vehicle noise using a microphone included in an audio system 232 of the vehicle.

One or more additional sensors may be included in a sensor subsystem 210 of the in-vehicle computing system 109. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 109 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 109 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 109 may be coupleable to and/or communicate with one or more external devices 150 located external to vehicle 102. While the external devices are illustrated as being located external to vehicle 102, it is to be understood that they may be temporarily housed in vehicle 102, such as when the user is operating the external devices while operating vehicle 102. In other words, the external devices 150 are not integral to vehicle 102. The external devices 150 may include a mobile device 128 (e.g., connected via a Bluetooth, NFC, WIFI direct, 4G LTE, 5G connection, or other wireless connection) or an alternate Bluetooth-enabled device 252. Mobile device 128 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 150 may communicate with in-vehicle computing system 109 either wirelessly or via connectors without departing from the scope of this disclosure. For example, external devices 150 may communicate with in-vehicle computing system 109 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 128. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 128 from in-vehicle computing system 109 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, amplifier etc.) or other applications (e.g., navigational applications) of mobile device 128 to enable the requested data to be collected on the mobile device or requested adjustment made to the components. Mobile device application 244 may then relay the collected information back to in-vehicle computing system 109.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers 235. Vehicle audio system 232 may be passive or active such as by including a power amplifier. In some examples, in-vehicle computing system 109 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 102. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers 235 of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 109, such as via communication module 222. The control elements of the vehicle control system may be physically and permanently positioned on and/or in the vehicle for receiving user input. In addition to receiving control instructions from in-vehicle computing system 109, vehicle control system 230 may also receive input from one or more external devices 150 operated by the user, such as from mobile device 128. This allows aspects of vehicle systems 231 and vehicle controls 261 to be controlled based on user input received from the external devices 150.

In-vehicle computing system 109 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via FR such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 150 (such as to mobile device 128) via external device interface 212.

One or more elements of the in-vehicle computing system 109 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 109 and mobile device 128 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

In some examples, vehicle 102 may operate in one or more autonomous modes where some or all vehicle operations (e.g., acceleration, braking, steering) are controlled automatically without driver input. To facilitate autonomous or semi-autonomous operation, the vehicle may utilize output from the various sensors described herein (e.g., a radar sensor, a machine vision camera) to identify and track vehicles, pedestrians, bicyclists, rough roads, potholes, and other objects and report those objects to an autonomous control module. The autonomous control module may be part of the vehicle control system 230.

For example, the radar sensor may communicate with the autonomous control module over a vehicle data network such as the CAN bus, Flexray, or Ethernet. The machine vision camera may also identify lane markings and report the curvature of the road ahead to the autonomous control module. It should be understood that the radar sensor and machine vision camera here are exemplary to represent any number of possible sensors. In practice, a vehicle may have many more sensors than the two discussed herein. For example, vehicles may utilize multiple radar sensors and cameras which face in different directions, have different ranges, and have different fields of view.

The autonomous control module may process information received from the vehicle sensors (e.g., the radar sensor and the machine vision camera) and calculate vehicle control actions in response thereto. The autonomous control module may communicate with the vehicle's brakes to initiate braking if the sensor data indicates the presence of an object ahead and in the path of the host vehicle. The autonomous control module may also communicate with the vehicle's steering system to apply torque to the steering and prevent the vehicle from drifting out of the lane or to steer around an object in the path of the vehicle.

With arrival of augmented reality (AR) in autonomous vehicles and automotive world, it provides opportunities to implement various scenarios without distracting driver attention. AR can be used to create any landscape virtually and show how it is going to look without the need to build something. Thus, embodiments are disclosed herein to create and show, via AR, quality of service (QoS) parameters of 5G signal strength, smart destinations, point of interest, charging stations, tourist attractions on a given route in autonomous vehicles, etc.

Usage of mobile phones in vehicles by drivers and other forms of driver multi-tasking leads to distraction and its contribution to road accidents. In contrast, an AR projection unit mounted behind a steering wheel and projecting on the windshield of a vehicle, as will be discussed in more detail below, may reduce driver distraction while informing the driver and/or any passengers of desired/relevant information for efficient navigation, awareness of road hazards, and so forth, which may improve the driving experience.

This method relates to systems, devices and methods for AR projection for vehicle driver assistance. One of the main aspects of this method is to receive data from a vehicle, analyze, and send augmented images back to the vehicle for projection on the display. Augmenting images include generated images from information received from vehicle and pre-stored images of popular destinations, generated images for displaying QoS parameters, for example.

In AR projections, most commonly used method is usage of projection display with touch screen capabilities. One advantageous feature of this disclosure is that a method is employed where the windshield is used as a plane to project augmented images. If too many AR elements are presented, or if AR elements are presented in an ad hoc manner, the resulting real-world view can be cluttered, potentially obscuring the driver's view of objects and hazards. Thus, the augmented images may be created with minimalistic information without distracting drivers and without affecting system functionalities.

Figure 3:
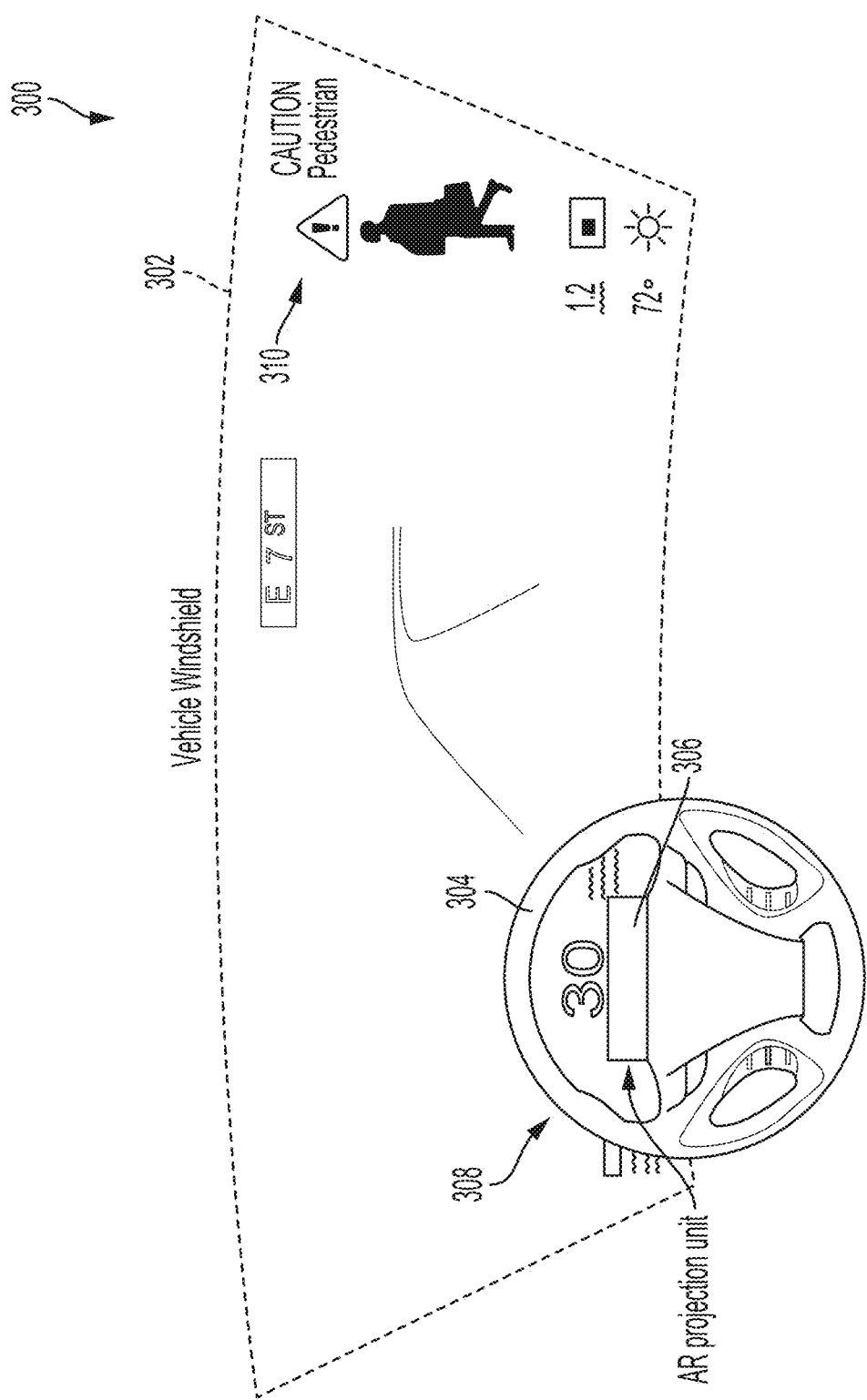
FIG. 3 shows an example augmented reality (AR) view presented on a windshield of a vehicle in accordance with one or more embodiments of the present disclosure.

FIG. 3 schematically shows an example augmented reality (AR) view 300 including augmentations displayed on a plane of a vehicle, herein a windshield 302. The augmentations may be projected from an augmented reality projector 306 (AR projector 306) mounted on a steering wheel 304 of a vehicle, such as vehicle 102 of FIG. 1. As used herein, augmentations may refer to augmented reality display elements (e.g., images) that are projected onto a surface (such as a surface of the windshield), where the surface is transparent or partially transparent, thereby enabling the augmentations to mix with the real-world environment around and behind the surface.

In the example shown in FIG. 3, different sets of augmentations are displayed at different locations on windshield 302. For example, a first set of augmentations 308 is displayed proximate the steering wheel 304 (e.g., above the steering wheel, immediately to the left and/or right of the steering wheel, etc.). The first set of augmentations 308 includes vehicle information (e.g., vehicle speed, navigation information, vehicle-based alerts such as diagnostic indication lights) and thus is positioned near the field of view (FOV) of the driver, which may help facilitate driver monitoring of the vehicle information without requiring the driver to divert his or her attention away from the road. A second set of augmentations 310 is displayed in a different display area than the first set of augmentations 308, herein along the right-hand (e.g., passenger side) of the windshield 302. The second set of augmentations 310 may include emergency notifications (e.g., detected obstacles, upcoming inclement weather, upcoming accidents), weather information, points of interest along the vehicle's route, etc. In some examples, the second set of augmentations 310 may only be displayed when the vehicle is operating in an autonomous driving mode, where vehicle maneuvering, acceleration and braking, etc., are controlled automatically by the vehicle without input from the driver. In this way, the second set of augmentations 310, which may be positioned in a location that may clutter the driver's FOV, may only be displayed when full driver attention is not needed to operate the vehicle.

Figure 4:
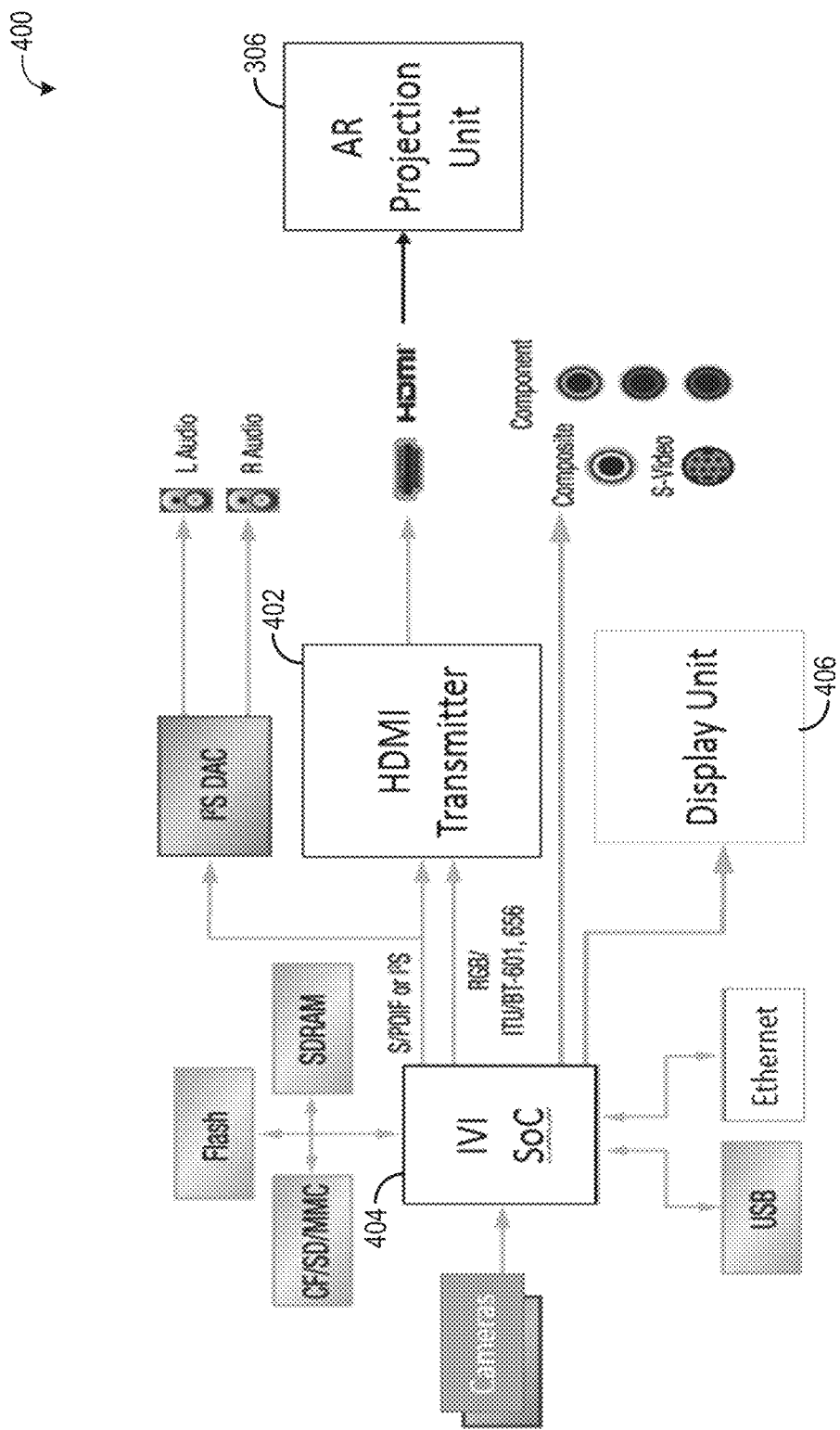
FIG. 4 is a block diagram showing an example AR system in accordance with one or more embodiments of the present disclosure.

The AR projector 306 may receive the augmentations to display from an in-vehicle computing system, such as the in-vehicle computing system 109. FIG. 4 shows a block diagram of an example AR system 400. AR system 400 includes the AR projector 306 coupled to a high-definition multimedia interface (HDMI) transmitter 402. The AR projector 306 may receive augmentations (e.g., images) to project, as well as instructions on where to project the augmentations (e.g., display coordinates for each augmentation), from the HDMI transmitter 402, which may transmit the augmentations and any additional information wirelessly to the AR projector 306, in some examples, or the HDMI transmitter 402 may transmit the augmentations and/or any additional information via a wired connection (e.g., an HDMI cable/connector).

The HDMI transmitter 402 receives the augmentations from an in-vehicle infotainment (IVI) system, such the infotainment system described above. The IVI system is a collection of hardware and software in automobiles that provides audio or video entertainment, and may include a combination of vehicle systems which are used to deliver entertainment and information to the driver and the passengers through audio/video interfaces, control elements like touch screen displays, button panel, voice commands, gestures and more. The IVI system may connect with smart automotive technologies such as ADAS systems, V2X/V2I connectivity solutions (e.g., vehicle to vehicle connectivity, vehicle to infrastructure connectivity, etc.), telematics devices, smartphones, sensors etc., and integrates them with each other to provide a safe driving experience.

As shown in FIG. 4, the IVI system includes an IVI controller 404, which may be a system on a chip (SoC) including a central processing unit (CPU), memory, input/output ports, secondary storage, etc. IVI controller 404 is a non-limiting example of the in-vehicle computing system 109. The IVI controller 404 may receive signals from one or more cameras, as well as other sensors, as explained above. The IVI controller 404 may communicate with other devices via USB and Ethernet connections, and may output audio signals to one or more speakers, also as explained above. The IVI controller 404 may also output images, video, etc., on a display unit 406. Display unit 406 may be a touchscreen (and thus may be non-limiting example of user interface 218) and/or may be a standard display device, and may be a head unit display (e.g., touchscreen 108 or display screen 111) and/or a display of an instrument cluster (e.g., instrument cluster 110). Display unit 406 may comprise an LCD (Liquid Crystal Display) or TFT (Thin Film Transistors) equipped with display technologies for complex and dynamic graphical displays. The IVI controller may transfer audio and video content to display screens, speakers and headphones via Bluetooth, HDMI cable, and USB. Images with JPEG, PNG, and BMP may be suitable for infotainment systems.

Figure 5:
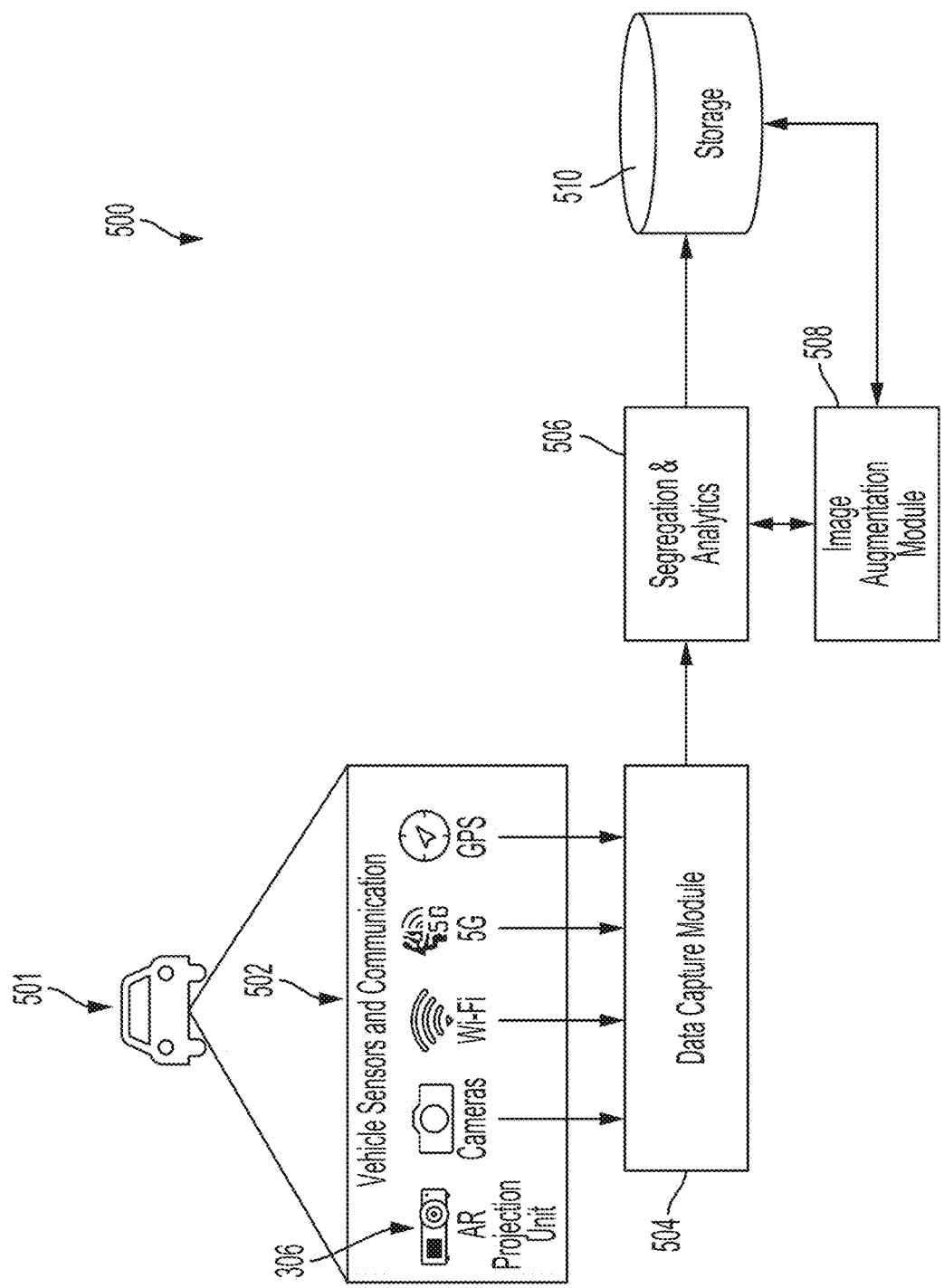
FIG. 5 is a block diagram showing an example augmentation generation system in accordance with one or more embodiments of the present disclosure.

FIG. 5 is a block diagram schematically showing an example augmentation generation system 500. System 500 includes a vehicle 501 including a set of vehicle sensors and communication modules 502, which may include one or more cameras, a GPS system, and communication modules (e.g., for communicating with other devices over WiFi and cellular communication networks), as explained above with respect to FIG. 2. The cameras may provide real-time obstacle detection to facilitate lane departure and track roadway information (like road signs). The GPS system may triangulates position of the vehicle using satellites. The communication modules may include GPS, Wi-Fi, near field communication (NFC), and/or Bluetooth modules to provide connectivity with external networks and devices. These communication modules may assist in establishing services such as navigation, Internet connectivity, and smartphone integration with the infotainment system.

Cameras, one of the main components of autonomous vehicles, are more dependent on the software being used to understand the captured video frames. Automotive sensors like proximity sensors, gesture recognition sensors for detecting ambient light, camera sensors, and other in-vehicle sensors integrate with infotainment systems to provide safety-related information to the driver and passengers. Connectivity components like Wi-Fi, 5G/LTE, GPS modules are used various applications like path planning techniques, autonomous driving, obstacle detection, parking assistance, etc. Infotainment systems support advanced vehicular features like daytime running lights indicators, climate control in the vehicle, voice assistants to control system functionalities.

Vehicle 501 also includes the AR projector 306. In order to generate the augmentations that are sent to the AR projector 306, system 500 includes a data capture module 504. The data capture module 504 receives output/signals from the set of vehicle sensors and communication modules 502. The output/signals from the set of vehicle sensors and communication modules 502 may include images and/or video captured by the cameras, location information (e.g., current location of the vehicle) from the GPS system, environmental and/or additional information from the WiFi and/or cellular network communication modules (e.g., local weather conditions, nearby accidents, points of interest, WiFi and/or cellular network coverage, etc.). A segregation and analytics module 506 may receive the output/signals obtained by the data capture module 504 and may process the output/signals in order to determine various parameters along the current route of the vehicle (such as weather conditions along the route, cellular network coverage along the route, whether the images/video from the cameras include vehicles or other objects, etc.). The segregation and analytics module 506 may communicate the determined parameters along the current route of the vehicle to an image augmentation module 508, which may determine which augmentation(s) are to be displayed and send the augmentations to the AR projector based on the determined parameters. The image augmentation module 508 may retrieve augmentations (e.g., images) from a storage module 510 (which may be a secondary storage module of the IVI system). In some examples, the image augmentation module 508 may generate augmentations on the fly, for example by modifying augmentations obtained from storage module 510. For example, the segregation and analytics module 506 may determine, based on the output/signals obtained by the data capture module 504, that a pedestrian is positioned to cross the street in front of the vehicle. The image augmentation module 508 may retrieve a pedestrian warning augmentation from storage 510 (such as the pedestrian warning augmentation shown in FIG. 3) and send the pedestrian warning augmentation to the AR projector.

In some examples, predefined augmentations/images may be stored in storage 510. Image augmentation module 508 may adjust a selected predefined image (e.g., pedestrian warning) based on information obtained from one or more vehicle sensors (e.g., position of the detected pedestrian, size of the detected pedestrian, amount of ambient light, weather conditions, and so forth) so that the displayed augmentation matches aspects of the real world/appears to be a part of the real world. In some examples, the image augmentation module 508 may include one or more artificial intelligence based models, such as CNNs, that may be trained to adjust the selected image(s) based on the information obtained from the vehicle sensors.

In some examples, real-time information of the vehicle, such as current speed, may be determined from a Vehicle Information Processor (VIP) module which is interfaced with the IVI controller. For example, as explained above with respect to FIG. 2, the IVI controller may interface with the VIP (which may be a non-limiting example of the vehicle control system 230 of FIG. 2) to obtain analog signals (such as current velocity), digital signals provided by individual information sources (such as clocks, thermometers, location sensors such as Global Positioning System [GPS] sensors, etc.), digital signals propagated through vehicle data networks (such as an engine CAN bus through which engine related information may be communicated). Further, information related to direction, motion tracking, driver actions, and/or driver eye movement may be acquired through an advanced driver assistance system (ADAS) chip which is interfaced with the IVI controller or an operational telematics unit. The ADAS chip may handle, as illustrative and non-limiting examples, processing relating to ADAS such as front-facing camera, short/long range radar, eMirror, and so on, as well as DMS/OMS, automated parking, highway pilot, evasive steering assistant, intelligent intersection crossing, surround view/parking, and so on. The ADAS chip may be part of the autonomous control module described above.

This information may be assimilated quickly and fed back to the augmentation module for image generation. Finally, AR projection co-ordinates on a given projection area are programmable and can be altered in a given scenario. The system may employ a client-server architecture where the application communicates to the augmentation module (AM). For example, this real time information and augmentation markers (AR markers) can be sent to AM as requests and corresponding metadata (projection co-ordinates) are returned as a response.

In this way, various parameters that may be helpful to know for a smooth drive, including location of car or objects around the car, quality of service (QoS) parameters in the environment e.g., 4G/5G coverage, fastest and safe route to destination, and capability to assist drivers in emergency situations, may be determined and used to obtain/generate augmentations that are displayed via the AR projector. All the data objects pertaining to personally identifiable information and privacy data may be encrypted and shared through a secure channel.

Figure 6:
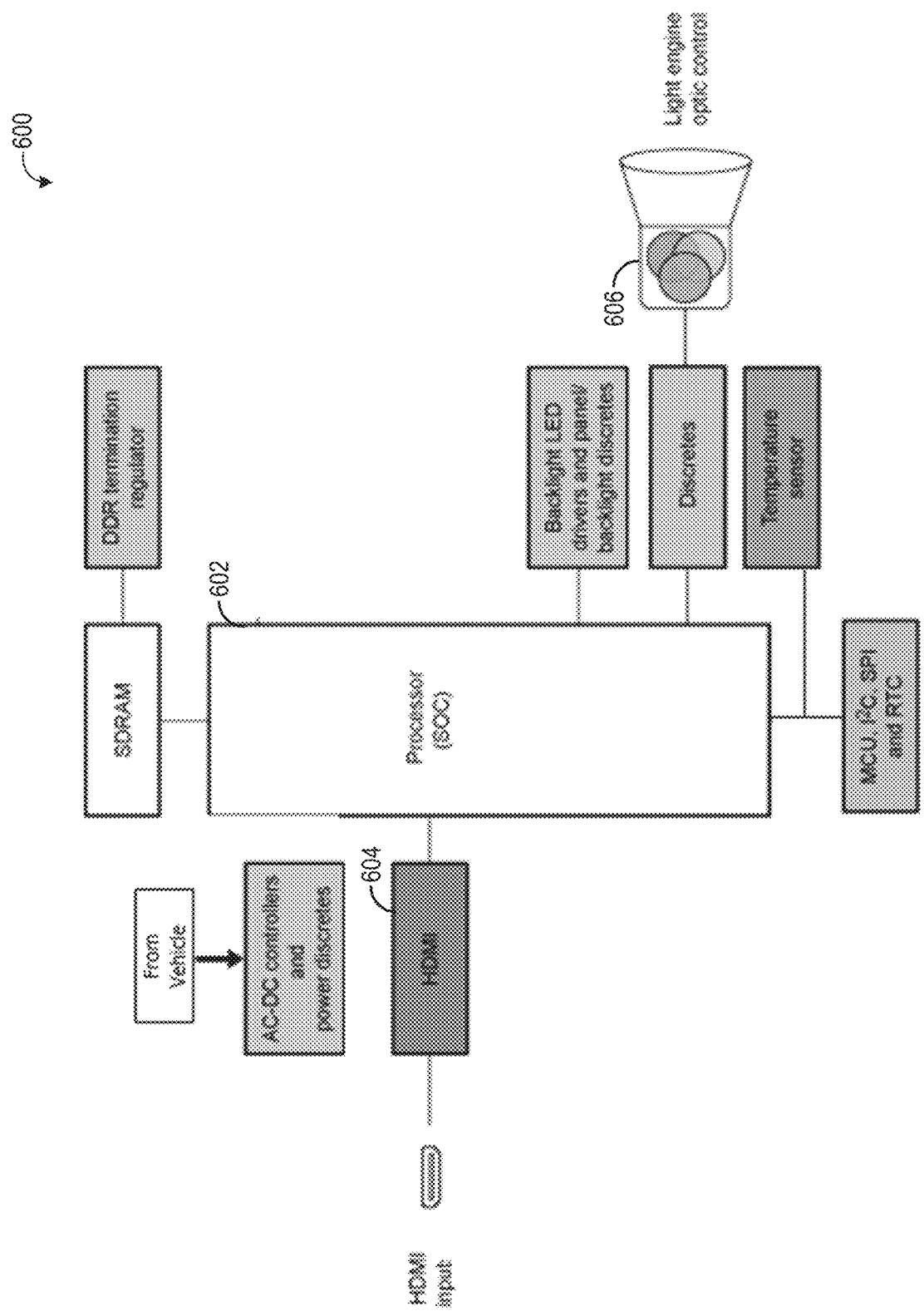
FIG. 6 is a block diagram showing an example AR projector in accordance with one or more embodiments of the present disclosure.

FIG. 6 shows a block diagram schematically illustrating components of an AR projector 600, such as AR projector 306. AR projector 600 includes a processor 602 (e.g., a system on a chip) that receives augmentations sent via HDMI and received by an HDMI receiver 604. The AR projector 600 includes a plurality of light emitters 606, such as light emitting diodes (LEDs), and a lens 608. Via various electronics (e.g., transistors, resistors, etc., referred to in FIG. 6 as discretes), the processor 602 may control which light emitters are activated, the intensity of the light that is output by the light emitters, etc. The AR projector 600 may be powered by a vehicle power source (e.g., vehicle battery). The AR projector described with respect to FIG. 6 may be mounted behind and/or on top of a steering wheel and positioned in such a way that a windshield is used as a projection plane, as described with respect to FIG. 3. In turn, augmented images received from the in-vehicle controller/computing system are projected on the windshield.

The projector shown in FIG. 6 may include a SoC which has capability to convert the incoming RGB signals in a digital picture frame (received at the HDMI interface) into light beams which are focused on to a plane to show the color images (e.g., the augmented images). The color in digital images is stored and processed using just 3 colors: Red, Green and Blue, usually written as RGB color for this projection unit. When the 3 primary colors RGB are combined or added together in different proportions, millions of colors can be produced on the projection plane.

Figure 7:
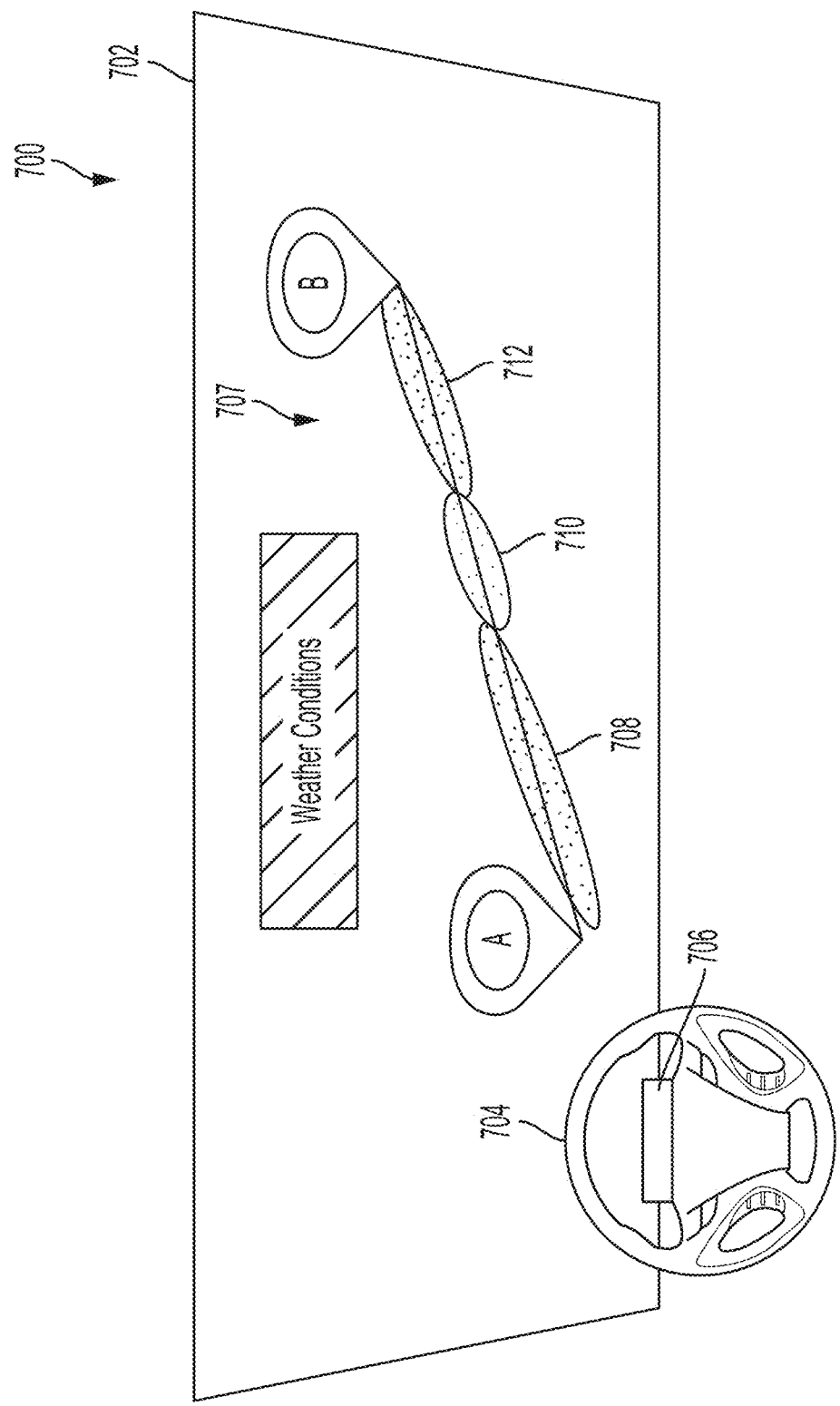
FIG. 7 shows another example AR view presented on a windshield of a vehicle in accordance with one or more embodiments of the present disclosure.

FIG. 7 shows an example AR view 700 that may be generated using the AR system described herein. AR view 700 includes a windshield 702 and a steering wheel 704 of a vehicle. An AR projector 706 is mounted on and/or behind the steering wheel 704. The AR projector 706 is projecting an augmentation 707 on the windshield 702. The augmentation 707 includes a route that the vehicle is currently following (e.g., from point A to point B). The augmentation 707 further includes indicators of weather conditions along the route. For example, a first region 708 of the route includes fair weather conditions, a second region 710 includes potentially problematic weather conditions (e.g., snow, heavy rainfall, fog, ice), and a third region 712 includes fair weather conditions. By highlighting the weather conditions across the entire route, the driver and/or any passengers may be informed of potential driving issues before encountering the issues, which may provide an opportunity to reroute or otherwise prepare for the upcoming weather conditions. For example, when the weather conditions include heavy rainfall or fog, autonomous driving may be deactivated, and thus the driver may be informed so that the driver can prepare to resume full control of the vehicle. The regions of the different weather conditions may be updated in real-time as the weather changes and as the vehicle continues to traverse along the route. Further, by graphically indicating, via the augmentation 707, real-time weather conditions along an entirety of the route, the driver may quickly assess weather and driving conditions for the whole route without having to navigate through multiple pages of information (e.g., as would be the case if the driver were to look up weather conditions on a smartphone or other device) or zoom in/out or manually navigate across a map showing weather conditions, which may increase driver safety and improve the driver's experience with the vehicle system. In the example shown in FIG. 7, the augmentation 707 extends across a majority of the windshield 702, but the augmentation 707 may be displayed at virtually any portion of the windshield without departing from the scope of this disclosure.

Figure 8:
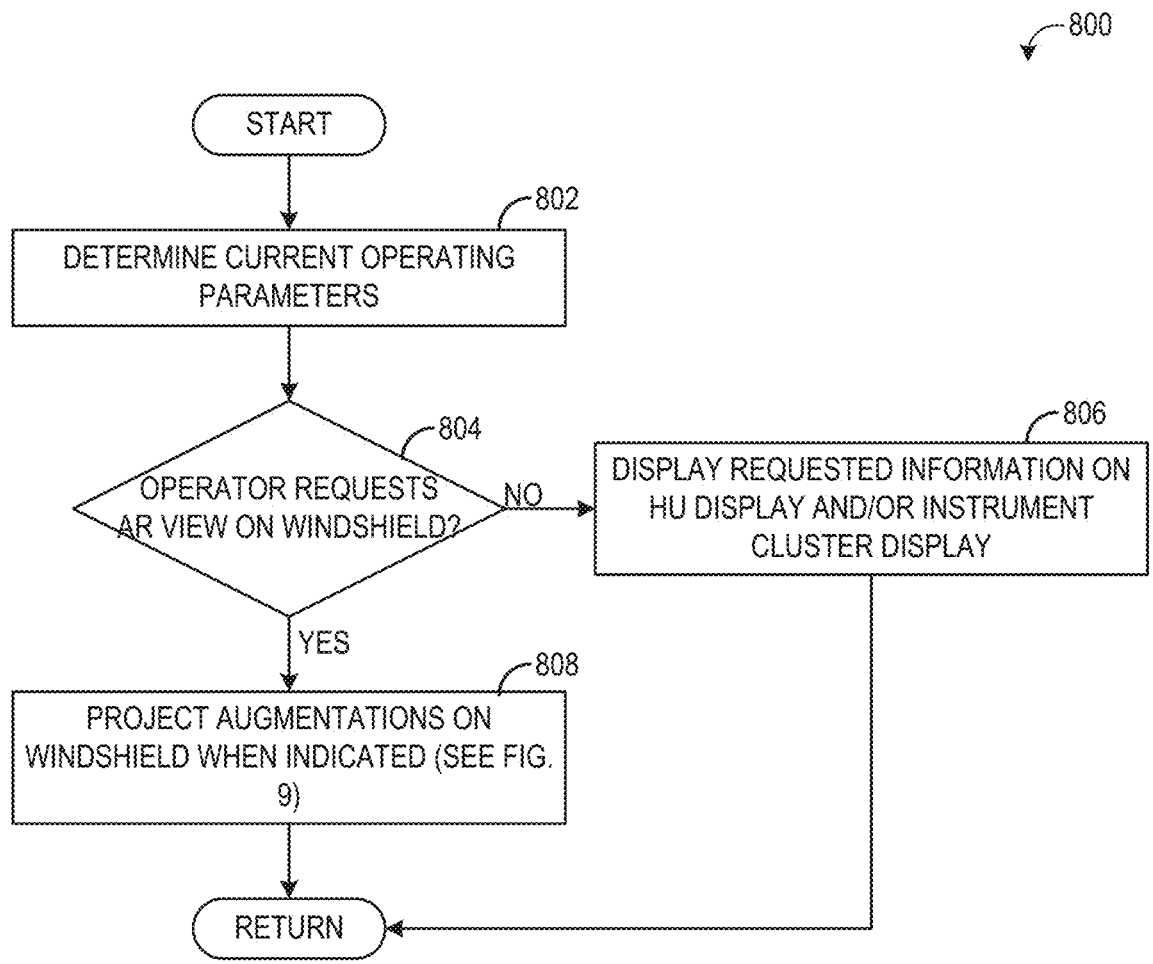
FIGS. 8 and 9 are flowcharts of example methods for presenting information in a vehicle using the example systems of FIGS. 1-2 and 4-6.

Turning now to FIG. 8, it shows a flowchart illustrating a method 800 for displaying information in a vehicle. For example, method 800 may be performed using the components of in-vehicle computing system 109 and/or AR system 400 of FIG. 4. Method 800 may be carried out according to instructions stored in non-transitory memory of an in-vehicle computing device, such as in-vehicle computing system 109 or IVI controller 404.

At 802, current operating parameters are determined. The current operating parameters may include current vehicle operating parameters, such as vehicle speed, vehicle assistance mode (e.g., autonomous operation, semi-autonomous operation, or full driver control), current in-vehicle infotainment settings, current route, and so forth. The current operating parameters may be determined based at least in part on the sensors and/or communication modules described above with respect to FIGS. 2 and 4. At 804, method 800 determines if an operator of the in-vehicle infotainment system (e.g., a driver or a passenger of the vehicle) has requested that an augmented reality view (AR view) be presented via the vehicle windshield. For example, the operator may enter input via a user interface (e.g., user interface 218) of the vehicle requesting that at least some requested information be displayed via augmentations on the windshield.

If the operator has not requested the AR view on the windshield (e.g., if no request for the AR view has been entered by the operator, or the operator requests to view additional information only via the device display(s) of the infotainment system), method 800 proceeds to 806 to display any requested information on a device display, which may include a head unit display (e.g., touchscreen 108 or display screen 111) and/or a display of an instrument cluster (e.g., instrument cluster 110). The additional information that is displayed may include the same information that would be displayed if the AR view were selected (which is described in more detail below) and/or additional information such as vehicle climate control information, vehicle audio system information, etc. Method 800 then returns.

If the operator has requested the AR view on the windshield, method 800 proceeds to 808 to project augmentations on the windshield when indicated, which is described below with respect to FIG. 9. Briefly, the AR projector may receive augmentations to display on the windshield from the in-vehicle computing system based on operator input, data gathered by vehicle sensors and/or communication modules, etc. The augmentations may include information pertaining to aspects of the current vehicle route, such as route-specific emergency notifications, communication coverage, points of interest, and so forth. Further, in some examples, the augmentations that are displayed and/or the position of the displayed augmentations on the windshield may be adjusted based on whether the vehicle is being operating in an autonomous mode. Method 800 then returns.

Figure 9:
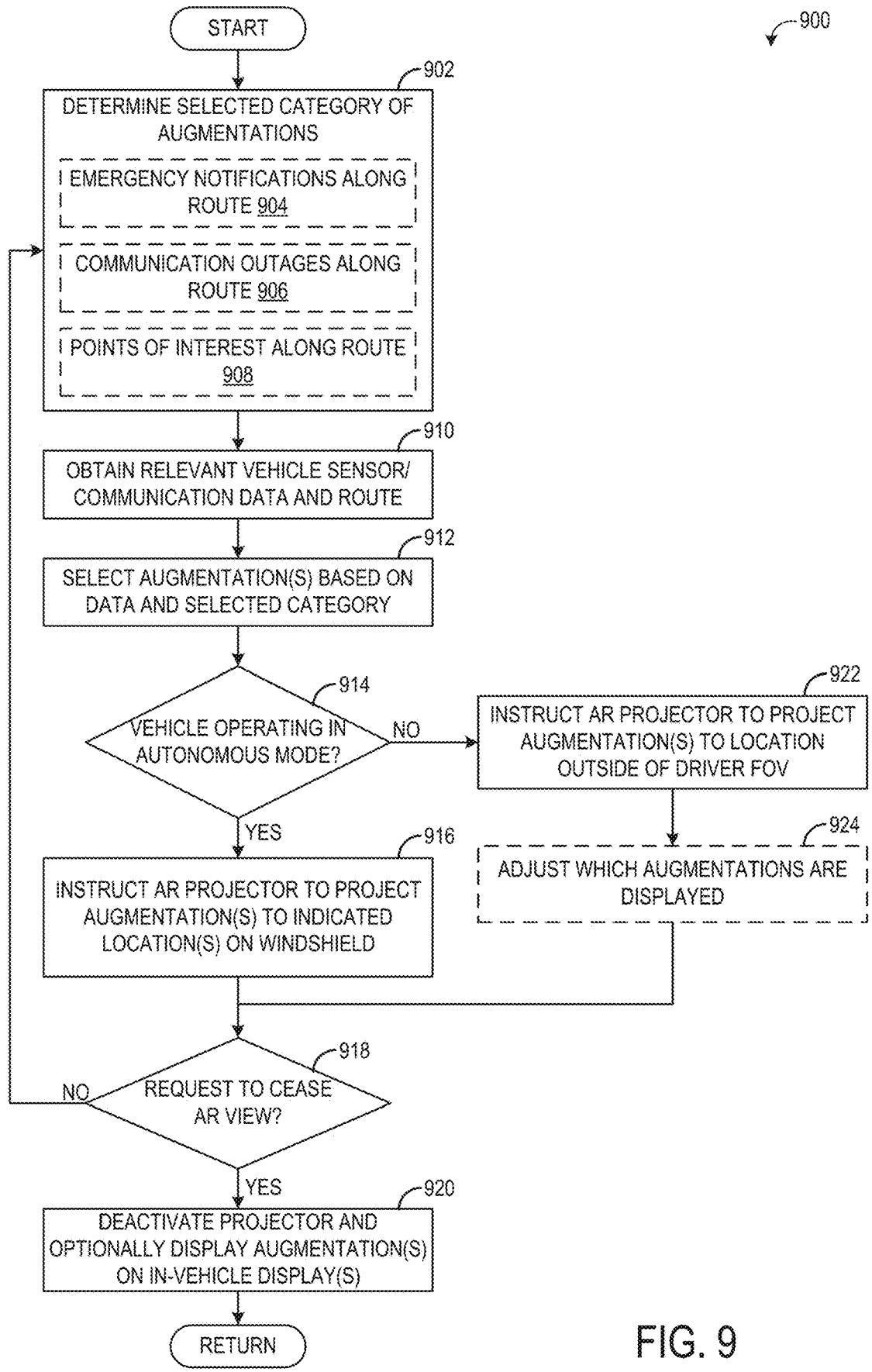

FIG. 9 is a flowchart illustrating a method 900 for displaying augmentations on a windshield of a vehicle. For example, method 900 may be performed using the components of in-vehicle computing system 109 and/or AR system 400 of FIG. 4. Method 900 may be carried out according to instructions stored in non-transitory memory of an in-vehicle computing device, such as in-vehicle computing system 109 or IVI controller 404. In some examples, method 900 may be carried out as part of method 800, e.g., in response to an operator request for an AR view on a windshield.

At 902, method 900 determines a selected category (or categories) of augmentations to display. For example, the operator of the infotainment system may enter input specifying one or more categories of information to view via the displayed augmentations. The categories may include vehicle operating information (e.g., vehicle speed), navigation information, detected obstacles, and route-specific information. The route-specific information may include emergency notifications along the route, as indicated at 904. The emergency notifications along the route may be displayed to notify the drivers and passengers on hazardous road conditions, route diversions, and emergency notifications. When emergency notifications are selected as an augmentation category, information about obstacles, conditions like road work in progress, weather notifications in case of rains, floods, torrents, etc., and distance in a given route to a destination may be displayed.

The route-specific information may further include communication outages along the route, as indicated at 906. As explained previously, the vehicle may include communication modules to communicate with external devices (e.g., other vehicles, road-side infrastructure) to support various vehicle and/or infotainment features. However, connectivity (e.g., 5G coverage) and data/connectivity loss may occur when the vehicle travels out of range of any base units, also referred to herein as road-side units (RSUs). The predicted loss of coverage along the route may be determined and displayed as an augmentation to give information about such instances of loss of connectivity, strength, bandwidth related network characteristics, and so forth.

The route-specific information may include points of interest along the route, as indicated at 908. The points of interest may include fuel or charging stations, prominent places, tourist destinations, restaurants, distance in the route to the destination, and so forth. When points of interest are selected as an augmentation category, augmentations indicating identified points of interest along the route may be displayed.

While the various augmentations categories are described herein as being selected by a user, it is to be understand that in some examples, the categories may be selected automatically, all categories may be selected (and different augmentations may be cycled for display), more than one category may be selected at any one time, etc.

At 910, relevant vehicle sensor/communication data and the current route are obtained. For example, the user may enter input specifying a destination location, and based on the source (e.g., current location) and destination location coordinates, a dynamic route may be calculated. Based on the category or categories of augmentations that will be displayed, the relevant vehicle sensor/communication data that is obtained may include vehicle data, weather information along the route from a weather service, image information from one or more cameras (which may be used to determine if any obstacles are in range of the vehicle, for example), WiFi and/or cellular network coverages/predicted outages along the route as determined based on the WiFi and/or cellular communication modules, and so forth.

At 912, one or more augmentations are selected based on the selected category or categories and the obtained sensor/communication data. For example, an augmentation may be selected that includes the determined dynamic route in the form of a map, and the augmentation may be modified to show weather conditions along the route (as shown in FIG. 7), network outages along the route, points of interest along the route, etc. The one or more augmentations that are selected may further include augmentations representing vehicle operating information, such as current vehicle speed.

At 914, method 900 includes determining if the vehicle is operating in an autonomous mode where the vehicle is operated without driver input. Operation in the autonomous mode may be carried out in response to a user request to operate in the autonomous mode (e.g., based on user input to a user interface, such as a touchscreen of the infotainment system, a button on the steering wheel or instrument cluster, etc.).

If the vehicle is operating in the autonomous mode, method 900 proceeds to 916 to instruct the AR projector to project the selected augmentation(s) to one or more indicated locations on the windshield. Due to operation in the autonomous mode, the entire displayable area of the windshield may be available as display area for projecting the augmentations, as driver distraction or cluttering the FOV of the driver is less of an issue during autonomous operation. (In some examples, the entire windshield may be displayable, meaning that an augmentation could be projected onto any portion of the windshield. In other examples, only one or more portions of the windshield may be displayable, meaning that augmentations may be projected onto only certain regions of the windshield and not the entire windshield.) Thus, each augmentation may be displayed at a respective location on the windshield that is based on user preference, the type of augmentation that is being displayed (e.g., a map of the route including weather conditions may be displayed in a first display location, such as in front of the passenger seat, while vehicle operating parameters may be displayed at a second display location, such as above the instrument cluster), current vehicle orientation, current driver FOV, and/or combinations thereof.

For example, an augmentation may be displayed in a screen-locked manner, where the augmentation is displayed at assigned display coordinates that do not change even as the vehicle orientation changes, driver FOV changes, etc. In some examples, an augmentation may be displayed in a world-locked manner, where the augmentation is displayed at the same location relative to an object or location in the real world, such as a pedestrian warning augmentation being displayed near a detected pedestrian. In such a configuration, the world-locked augmentation may move as the real-world object moves and/or the display coordinates of the augmentation may change as the orientation of the vehicle changes, to maintain the fixed relationship between the augmentation and the real-world object. In still further examples, an augmentation may be displayed in a body-locked manner, where the augmentation is displayed at display coordinates that maintain the augmentation in a fixed location of the driver or passenger FOV, even as the FOV changes. In some examples, augmentations may be displayed at combinations of screen-locked, world-locked, and/or body-locked configurations, such as a first augmentation being displayed in a world-locked position (e.g., a pedestrian warning augmentation) and a second augmentation being displayed in a screen-locked position (e.g., augmentations showing vehicle operating parameters).

When augmentations are displayed on the windshield during autonomous operation, some similar images may be displayed on other in-vehicle displays, such as vehicle operating parameters being displayed both the windshield and on a display of a vehicle instrument cluster. However, during operation the autonomous mode, some augmentations may only be displayed on the windshield and not on any other vehicle displays, such as a map showing weather conditions, points of interest, etc.

At 918, method 900 determines if a request to cease the AR view has been received. The request to cease the AR view may be received via user input (e.g., a user may request that augmentations no longer be shown on the windshield). In some examples, the request to cease the AR view may be output by the in-vehicle computing system, such as in response to detecting that the vehicle is no longer operating in the autonomous mode or in response to detecting an adverse condition where driver attention to the road is indicated. If a request to cease the AR view is not received, method 900 returns to 902 to continue assessing requested augmentations and real-time sensor/communication data in order to continue selecting and displaying augmentations based on the requested augmentations and sensor/communication data.

If a request to cease the AR view is received, method 900 proceeds to 920 to deactivate the AR projector or otherwise stop displaying augmentations on the windshield and, in some examples, display the augmentation(s) on one or more in-vehicle displays. In this way, the augmentation(s) that are currently being displayed on the windshield may instead be displayed on an in-vehicle display. For example, a map of weather conditions along the route that was previously displayed on the windshield may instead be displayed on the infotainment system display (e.g., display screen 111). In doing so, seamless display of desired information may be provided, by allowing display of the information across multiple display areas, including the windshield when desired. Method 900 then returns.

Returning to 914, if it is determined that the vehicle is not operating in an autonomous mode, for example if the vehicle is being fully operated by the driver (e.g., no cruise control, no steering assistance, etc.) or partially operated by the driver (e.g., adaptive cruise control on, but the driver is still fully controlling steering), method 900 proceeds to 922 to instruct the AR projector to project the selected augmentation(s) to one or more locations outside the driver FOV. For example, the augmentation(s) may be displayed in a bottom or top corner of the windshield (e.g., on the passenger's side), rather than across the middle of the windshield. Thus, when operating in the autonomous mode, in some examples, augmentations may be displayed in the driver FOV. In contrast, when operating in a semi-autonomous or non-autonomous mode, augmentations may not be displayed in the driver FOV (assuming a standard FOV for driving, where the driver FOV includes a fixed region of the windshield in front of the driver). In some examples, the augmentations may displayed in a fixed region of the windshield that is assumed to be out of the driver FOV when the driver is looking straight ahead at the road. In other examples, the augmentations may be displayed based on the actual driver FOV, such that the display coordinates of the augmentations may change based on vehicle orientation (e.g., which may indicate the vehicle is turning or traversing a curve, and thus the driver FOV may have shifted) or the gaze direction of the driver.

At 924, method 900 optionally includes adjusting which augmentations are displayed in response to the determination that the vehicle is not operating in the autonomous mode (relative to which augmentations would be displayed if the vehicle were operating in the autonomous mode). In order to reduce driver distraction, it may be beneficial to limit the augmentations that are displayed when the driver is controlling the vehicle. Thus, the augmentations may be adjusted in size and/or fewer augmentations may be displayed. For example, the vehicle operating parameter augmentations may be maintained on the windshield (to allow the driver to more easily assess vehicle operating parameters relative to looking down at the instrument cluster), while the various maps discussed herein may be removed (and, in some examples, displayed on an in-vehicle display). Method 900 then proceeds to 918, as explained above.

Thus, method 900 provides for displaying one or more augmentations on a windshield using an AR projector, during an autonomous mode of operation or during semi- or non-autonomous modes of operation. The augmentations that are displayed may include route-specific notifications, such as weather conditions, emergency notifications, cellular or WiFi data coverage, points of interest, and so forth. To generate the route-specific augmentations, a user may enter a destination location to the in-vehicle computing system to enable information about emergency notifications, points of interest, communication coverage, etc., along the route. Based on the source and destination location co-ordinates, a dynamic route is calculated and an image of the route is generated.

In an example, from a maps/navigation database (explained below), points of interest may be calculated for all the location coordinates of route coverage. If there is a point of interest falling in the range of coordinates between the source and destination locations, the navigation route map is augmented with markings of points of interest and distance from the current route. A final augmented image is sent to the vehicle infotainment system for AR projection and display on the windshield. A similar approach may be taken to augment a generated image of the route with weather conditions (e.g., by contacting a weather service and augmenting the image with visual indications such as color representing different weather conditions), accidents along the route, road construction along the route, and so forth.

In another example, once the image of the route is calculated, QoS parameters are calculated for all the location coordinates of route coverage. If the QoS parameters are in accepted ranges, the generated image of the navigation route map is augmented and represented with a first visual representation, such as a green color. If the QoS parameters are not in accepted ranges, the generated image is augmented and represented in a different visual representation, such as red color, indicating signal interruptions and poor coverage in these areas. A final augmented image is sent to the vehicle infotainment system for AR projection and display on the windshield. Additional details about obtaining the QoS parameters are provided below.

Thus, the above described method may be deployed to display augmented images of obstacles, conditions like road work in progress, weather notifications in case of rains, floods, torrents, etc., wreckages and distance in a given route to a destination.

Figure 10:
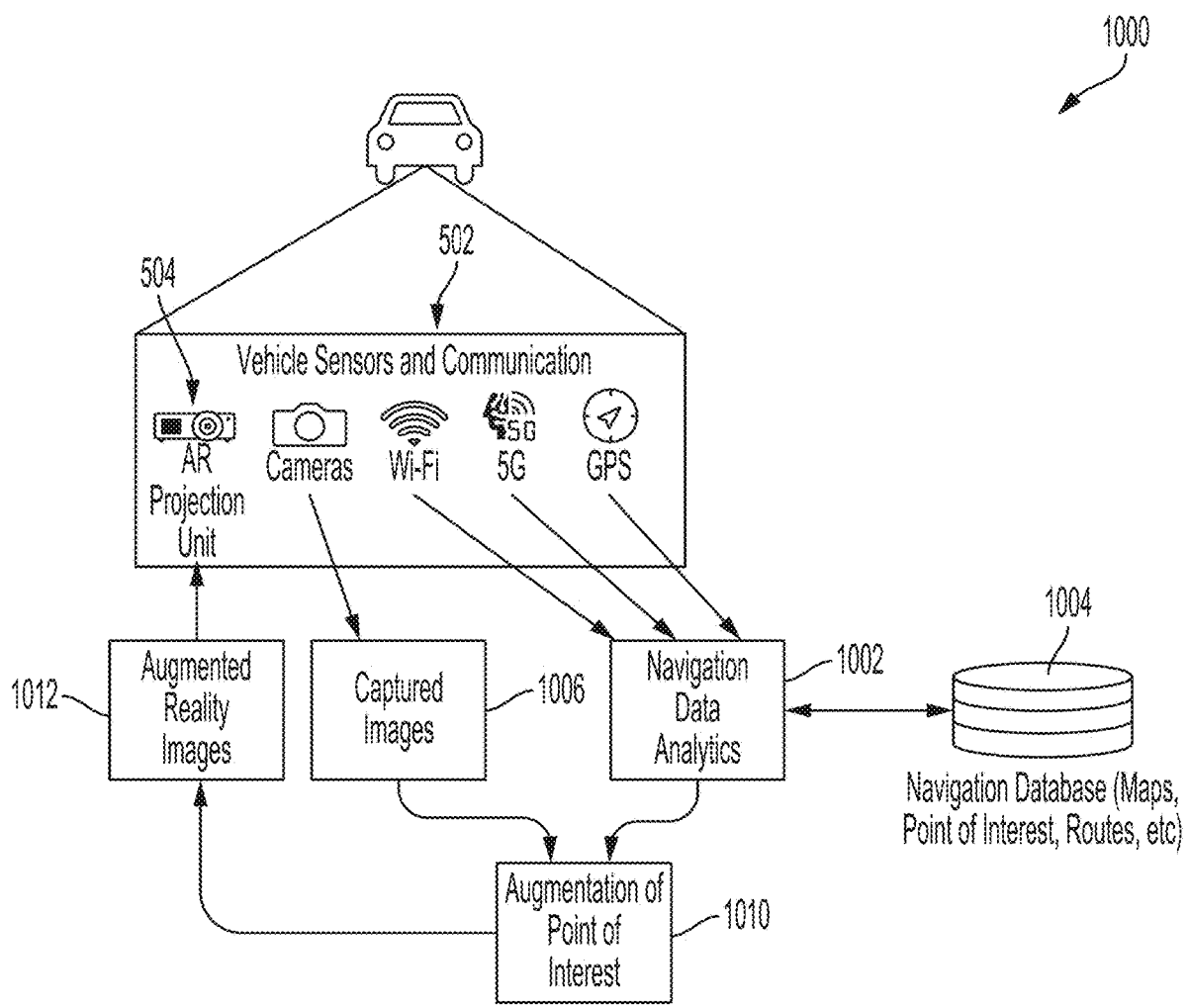
FIG. 10 is a block diagram showing another example augmentation generation system in accordance with one or more embodiments of the present disclosure.

FIG. 10 is a block diagram schematically showing a system 1000 for generating augmentations showing points of interest along a route. System 1000 includes some of the same components as system 500, and these components are numbered the same and are not reintroduced.

System 1000 includes a navigation and data analytics module 1002 that receives output/signals from the vehicle communication modules (e.g., WiFi, cellular data, GPS). The navigation and data analytics module 1002 may ascertain the source and destination location co-ordinates and/or determine the dynamic route based on the source and destination location coordinates. An image of a map of the route may be retrieved from a navigation database 1004. From the navigation database 1004, points of interest are calculated for all the location coordinates of the route. The navigation database 1004 may also store augmentations of the points of interest along the route (and other routes) that may be retrieved as well. The image of the map of the route may be augmented with points of interest along the route at an augmentation of point of interest module 1010 (which may be part of or a non-limiting example of image augmentation module 508). For example, gas stations along the route may be indicated with augmentations of fuel pumps, restaurants along the route may be indicated with augmentations of silverware and/or plates, etc. In some examples, images 1006 of the surroundings of the vehicle that are captured by the vehicle cameras may be provided to the augmentation of point of interest module 1010. The final augmented reality images 1012 (e.g., a map of the route including augmentations of some or all of the points of interest on the route) may be sent to the AR projector for display.

The images captured from vehicle cameras may be used in the back-end to apply traditional and evolving data augmentation techniques to create new training data from existing training data achieved using modern deep learning algorithms like convolutional neural networks (CNNs). Image data augmentation is a type of data augmentation involving creating transformed versions of images in the training data set (input images) that belong to the same class as the original images referring to pre-defined set of images like pedestrian crossings, road signs, tourist destination images, and weather images.

Augmented reality (AR) technology allows the user to see the real world and virtual objects together by superimposing virtual objects upon the real world. Algorithms of AR are classified into two methods. One method is marker-based AR method which uses artificial markers, the other is markerless AR method which uses natural features instead of artificial markers. Image processing methods such as adaptive thresholding, contour detection, edge detection, etc., along with AR algorithms may be used in combining real world images (captured images) and virtual objects.

FIGS. 11A-11C schematically show how data coverage (e.g., cellular data) along a route may be determined, in order to generate augmentations showing data coverage along the route as described above. FIG. 11A shows an example 1100 of vehicles on a road connecting to a road side unit (RSU). In a 5G network environment, base stations like femtocell, picocell, microcell and macrocells are used for signal coverage. Base stations used for road coverage are referred to as Road Side Units (RSUs).

TABLE 1

| Base Station Type | Coverage (km) | Bandwidth (MHz) |
| --- | --- | --- |
| Femtocell | 0.01 to 0.1 | 10 |
| Picocell | 0.1 to 0.2 | 20 |
| Microcell/metrocell | 1 to 2 | 20 to 40 |
| Macrocell | 5 to 32 | 60 to 75 |

Table 1 shows that the typical RSU coverage is from 0.01 Kms to 32 Kms based on the base station type deployed by the operator.

FIG. 11B shows an example scenario 1120 illustrating how a vehicle 1122 may move from a first RSU coverage area 1124 to a second RSU coverage area 1126, with a gap of coverage in between. As appreciated by FIG. 11B, vehicle 1122 starts within the first RSU coverage area 1124 that represents a region of adequate signal coverage from a first RSU (RSU-A). As vehicle 1122 moves along a road in the illustrated direction of travel, vehicle 1122 eventually leaves the first RSU coverage area 1124. When vehicle 1122 leaves the first RSU coverage area 1124, vehicle 1122 is out of range of any RSU and thus lacks 5G network coverage. Eventually, vehicle 1122 enters the second RSU coverage area 1124 that represents a region of adequate signal coverage from a second RSU (RSU-B).

The example scenario 1120 highlights the issue of 5G coverage and data/connectivity loss in case of poor QoS and losing connection with an RSU when the vehicle travels out of range of an installed RSU. The AR projection method discussed above with respect to FIG. 9 may be deployed to provide the vehicle operator/passengers information about such instances of loss of QoS, strength, bandwidth related network characteristics, and so forth.

In the background, the infotainment system of the vehicle (e.g., the in-vehicle computing system) keeps sending real-time 5G QoS parameters in a proprietary VINQ data format to data acquisition and augmentation modules. QoS parameters related to 5G network may include latency, peak data rates, available spectrum, and connection density and are packetized and transferred to analytics module for storage and processing. In a 5G network scenario, the method may provide information about the QoS parameters in a given route to a destination.

FIG. 11C shows an example VINQ data packet 1140. The VINQ data packets may include vehicle ID (to uniquely identify the vehicle), a packet ID (to identify the current packet), current vehicle coordinates (longitude and latitude), and 5G QoS parameters, such as latency, peak data rate, available spectrum, etc. The VINQ data packet is sent to the data acquisition and augmentation modules (e.g., data capture module 504 and image augmentation module 508). Once the VINQ packet is received, the packet is decoded and the 5G QoS data is stored for the current location coordinates. The navigation analytics database may then be updated.

As an example, referring back to FIG. 11B, the vehicle communication modules (e.g., the 5G module shown in FIGS. 5 and 10) may communicate with RSU-A while vehicle 1122 is in the first RSU coverage area 1124. Based on this communication, the 5G QoS parameters may be determined and sent in VINQ packets, as described above. However, when vehicle 1122 moves out of range of the first RSU coverage area 1124, the VINQ packets may indicate weak or no signal.

However, the systems and methods described herein may allow for advanced awareness of upcoming loss of communication data coverage, such as awareness of the gap between the first RSU coverage area 1124 and the second RSU coverage area 1126.

To determine areas with weak or no data coverage along the route, the vehicle may include a navigation system transceiver that is configured to receive wireless data including wireless black spot data (e.g., locations/boundaries of wireless black spots, wireless network coverage parameters within a wireless black spot, etc.), etc. from a remote service, such as a cloud storage device located remotely from the navigation system and/or remotely from the device (e.g., the smartphone, handheld device, in-vehicle computing system, etc.) that includes the navigation system. In some examples the wireless transceiver may receive route and/or black spot data (areas with no cellular data coverage, for example) information from a navigation data server. Upon receiving the wireless data, the transceiver may send the received data to a processor, for processing and storing.

The processor may receive a current location of the vehicle from the GPS system, for example, receive wireless black spot data information from the wireless transceiver and/or from on-board memory, receive a destination input from the user, and may generate route data, which is then stored in a data memory. As such, the data may include black spot data. Furthermore, the data may include a map of the route generated, for example. In some examples, the route may be displayed on as an augmentation on the windshield. In situations when there is no cellular coverage, the processor may retrieve the map from the map data memory. The processor may further cache the processed map along with the additional data relating to the black spots in the data. In some examples, information about upcoming black spots of data coverage may be received from other vehicles using vehicle-to-vehicle communication or other configurations.

One major advantage of this method is to improve the QoS by all services dependent on this connectivity can plan ahead and buffer data for certain distance. For example, a navigation application is aware of GPS loss (area shown in red on the route map, as explained above) for certain distance can buffer the navigation data prior to start of the journey. In another example, if any 5G service application like media streaming application is aware signal loss, the system may buffer the media contents ahead for that duration of signal loss and provide seamless user experience in viewing content.

The technical effect of displaying augmentations on a windshield is that vehicle occupants may be informed of upcoming road conditions, points of interest, communication outages, and the like, which may improve vehicle safety and/or occupant experience with the vehicle. A technical effect of generating the augmentations on an in-vehicle computing system is that the augmentations may be displayed on the windshield during certain conditions (e.g., autonomous driving) and then switched to being displayed on one or more in-vehicle displays (e.g., infotainment system display) during other conditions (e.g., non-autonomous driving) in a seamless manner, thereby continually providing vehicle occupants with desired information without cluttering the driver's FOV or providing undue distractions.

The description of embodiments has been presented for purposes of illustration and description. Suitable modifications and variations to the embodiments may be performed in light of the above description or may be acquired from practicing the methods. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, etc. The described methods and associated actions may also be performed in various orders in addition to the order described in this application, in parallel, and/or simultaneously. Further, the described methods may be repeatedly performed. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for presenting information in a vehicle, comprising:
   determining a route from a source location to a destination location;
   determining one or more features of the route;
   augmenting a map of the route with the one or more features to generate an augmented map;

during an autonomous mode, displaying one or more operating parameters at a first location of a windshield and the augmented map at a second location of the windshield of the vehicle; and in response to a switch to a non-autonomous mode, maintaining the display of the one or more operating parameters at the first location, and switching to display the augmented map on a vehicle display.

2. The method of claim 1, wherein the one or more features comprise weather conditions along the route, and wherein augmenting the map comprises overlaying one or more visual indications of the determined weather conditions along the route at locations corresponding to each determined weather condition.

3. The method of claim 1, wherein the one or more features comprise data communication quality of service parameters along the route, and wherein augmenting the map comprises overlaying one or more visual indications of the determined data communication quality of service parameters along the route at locations corresponding to each determined data communication quality of service parameter.

4. The method of claim 1, wherein the one or more features comprise points of interest along the route, and wherein augmenting the map comprises overlaying one or more visual indications of the determined points of interest along the route at locations corresponding to each determined point of interest.

5. The method of claim 1, wherein displaying the augmented map comprises displaying the augmented map at a first display location on the windshield, and further comprising displaying one or more additional augmentations at a second, different display location on the windshield.

6. The method of claim 1, wherein, during the autonomous mode, the vehicle is operated without direct input from a driver.

7. The method of claim 1, further comprising adjusting a size and/or display location of the augmented map.

8. An apparatus, comprising:
an augmented reality projector;
an in-vehicle computing system; and
a vehicle display operably coupled to the in-vehicle computing system, the in-vehicle computing system storing instructions executable to:
determine a route from a source location to a destination location;
obtain one or more features of the route;
augment a map of the route with the one or more features to generate an augmented map;
during an autonomous vehicle mode, display, via the augmented reality projector, one or more operating parameters at a first location and the augmented map on a windshield of the vehicle at a second location; and
in response to a switch to a non-autonomous mode, maintain the display of the one or more operating parameters at the first location, remove the display of the augmented map from the second location, and display the augmented map on the vehicle display.

9. The apparatus of claim 8, wherein, during the autonomous vehicle mode, the vehicle is operated without direct input from a driver.

10. The apparatus of claim 9, wherein the instructions are further executable to, in response to the switch to the non-autonomous mode, maintain the display of the one or more operating parameters at the first location.

11. The apparatus of claim 10, wherein the instructions are further executable to adjust a size and/or a display location of the augmented map.

12. A system for a vehicle, comprising:
an augmented reality projector;
a vehicle display; and
an in-vehicle computing system operably coupled to the augmented reality projector and the vehicle display, the in-vehicle computing system storing instructions executable to:
during an autonomous vehicle mode, display, via the augmented reality projector, an augmented map on a windshield of the vehicle, the augmented map including determining one or more features of a route along which the vehicle is to travel, wherein the augmented reality projector is further configured to display one or more vehicle operating parameter augmentations at a first display location of the windshield, and wherein the augmented map is displayed at a second display location of the windshield; and
responsive to a switch from the autonomous vehicle mode to a non-autonomous vehicle mode, display the augmented map on the vehicle display and not via the augmented reality projector and maintain display of the one or more vehicle operating parameter augmentations at the first display location.

13. The system of claim 12, wherein the one or more features comprise weather conditions along the route, and wherein the augmented map includes one or more visual indications of the determined weather conditions along the route at locations corresponding to each determined weather condition.

14. The system of claim 12, wherein the one or more features comprise data communication quality of service parameters along the route, and wherein the augmented map includes one or more visual indications of the determined data communication quality of service parameters along the route at locations corresponding to each determined data communication quality of service parameter.

15. The system of claim 12, wherein the one or more features comprise points of interest along the route, and wherein the augmented map includes one or more visual indications of the determined points of interest along the route at locations corresponding to each determined point of interest.

* * * * *